United States Patent [19]
Scheffler et al.

[11] 3,873,799
[45] Mar. 25, 1975

[54] METHOD OF MAKING A COMPOSITE SUPERCONDUCTING TUBE

[75] Inventors: Ernst Scheffler, Langenhagen; Gerhard Ziemek, Hannover, both of Germany

[73] Assignee: Kabel-und Metallwerke Gutehoffnungshutte Aktiengesellschaft, Hannover, Germany

[22] Filed: Oct. 19, 1973

[21] Appl. No.: 408,042

[52] U.S. Cl. ............ 219/61, 29/477, 29/599, 174/DIG. 6, 219/137
[51] Int. Cl. ............................ B23k 31/06
[58] Field of Search ............ 29/599, 472.3, 477; 219/137, 61; 174/126 CP, DIG. 6

[56] References Cited
UNITED STATES PATENTS

| | | | |
|---|---|---|---|
| 2,222,579 | 11/1940 | Wolcott | 29/477 X |
| 2,300,850 | 11/1942 | Wolcott | 29/477 |
| 3,616,530 | 11/1971 | Chester et al. | 29/599 |
| 3,774,004 | 11/1973 | Dubuc et al. | 219/61 |
| 3,775,840 | 12/1973 | Diepers et al. | 29/599 |
| 3,777,368 | 12/1973 | Pfister et al. | 29/599 |
| 3,783,503 | 1/1974 | Diepers | 29/599 |

OTHER PUBLICATIONS
Cryogenics, Vol. 12, No. 4, C. Graeme-Barber, et al. "Tubular Niobium/Cupper Conductors for AC Superconductive Power Transmission," August 1972, pp. 317-318.

*Primary Examiner*—C. W. Lanham
*Assistant Examiner*—D. C. Reiley, III
*Attorney, Agent, or Firm*—Ralf H. Siegemund

[57] ABSTRACT

A super-conductive assembly is made by overlaying copper and niobium strips longitudinally and welding them together through exposure of the copper strip side to arc welding. The laminated strip is rolled, folded longitudinally, welded along adjoining edges, and the resulting tube is then corrugated for use in a flexible cryogenic cable.

13 Claims, 6 Drawing Figures

PATENTED MAR 25 1975  3,873,799

METHOD OF MAKING A COMPOSITE SUPERCONDUCTING TUBE

BACKGROUND OF THE INVENTION

The present invention relates to a method for making a superconductive assembly, i.e., an assembly exhibiting superconduction when operated at low temperatures.

As far as presently known, the so-called industrial nations about double their energy consumption every ten years. Accordingly, the power supply must not only be increased at the same rate, but the power supply must be increased in its efficiency. The same holds true for the distribution of energy because a cut in losses here amounts to an effective increase in the supply.

It is known and has been proposed, to utilize the phenomenon, commonly known as superconductivity, for the transmission of electrical energy. The ohmic resistance drops to near zero at very low temperatures, close to absolute zero, and the effective insulative strength of insulation vs. break through is enhenced also at such low temperatures. For example, some metals or metal alloys, such as niobium, lead, niobium-tin, etc., have practically no ohmic resistance below a critical temperature, which of course varies from material to material; below such temperature the metal is regarded as being in the superconductive state.

The so-called hard superconductors are usually made of intermetallic compounds such as niobium-tin, niobium-zirconium, niobium-titanium, and possibly others; they have the advantage that their critical temperature is relatively high, up to 18°K. Unfortunately these materials exhibit the draw back that changes in the magnet field produces loss in transmitted energy. Moreover, these superconductors are quite often very brittle.

It follows, that so-called soft superconductors such as niobium and lead are better for the transmission of a.c. The critical temperature for lead is only a little above the boiling point of helium so that utilization of niobium is preferred. Also, the use of stabilized superconductors is preferred; such conductors are made in a compound construction of a superconductor and of an otherwise good conductor which is not superconductive at a reasonably practicable or desirable operating temperature, for example copper. The amount of copper present must be sufficient as far as cross-section available for current flow is concerned so that the copper can transmit the energy in the case of an interruption in the superconductive state, and until the cable is finally turned off.

Conductors of superconductive material are known otherwise which are made in that a niobium tape or strip is continuously formed into a tube around a copper wire. The adjoining edges of that strip are then welded, and the resulting tube is subsequently drawn onto the copper wire. Such a stabilized superconductor requires that in the case of loss of the superconductivity of the niobium tube or cladding the interface niobium-copper does not exhibit an increased resistance.

SUMMARY OF THE INVENTION

It is an object of the present invention to provide for a method of making a superconductive device in which a superconductive layer is electrically and mechanically connected to a carrier so that the device has a strong mechanical connection and exhibits low resistance in the interface.

In accordance with the preferred embodiment of the invention it is suggested to provide a copper strip and a niobium strip and to overlay and superimpose those two strips; electric arc welding is then used from the side of the exposed copper strip surface to provide a metallurgical welding bond between copper and niobium strips at their interface. The metallurgical bond is obtained specifically in that a zone of the copper strip, as subjected directly to the welding arc in any instant, begins to melt, and a diffusion layer between copper and niobium is provided in their interface. The diffusion zone provides for intimate bond between the strips after cooling.

Such a laminated strip can then readily be formed into a tube, welded along the adjoining strip edges and corrugated. Tube making is facilitated if the niobium strip is somewhat narrower than the copper strip, so that the niobium does not interfer with the welding of the split tube along adjoining strip edges.

A tubular superconductor can be made in that manner at practically unlimited length. The interior space of the tube will preferable be used as flow duct for a cryogenic coolant e.g. liquid helium. The tube can readily be used as a conductor inside of a coaxial and concentric tube assembly as used for cryogenic cable.

One will preferably provide for internal welding seams as between the copper and the niobium strips to cover most or all of the contacting surfaces. These seams may run parallel to each other and along the longitudinal extension of the strips, preferably overlapping each other laterally to obtain an uninterrupted bond in a zone which extends across the entire width of the strips. Alternatively welding seams may run criss-cross across the strips for a simpler versions of practicing the invention. Instead of one, single niobium strip, several niobium strips may be placed side by side and in contact with a sufficiently broad copper strip.

The flow of thermal energy out of the niobium tape should be impeded on the exposed niobium side of the overlaid strips; the formation of the diffusion layer is enhenced in that manner and the production speed can be increased accordingly.

Due to the interior welding seam of the laminated copper-niobium strip, its surface is no longer very smooth so that it should be rolled. Rolling reduces the thickness of the laminated strips and widens them accordingly; this in turn permits additionally utilization of narrower strips initially, which is a cost reducing factor because niobium is quite expensive, and only a very small cross-section is needed for energy transmission in the superconductive state. The strips are initially sufficiently thick individually to permit handling without danger of tearing, particularly as far as reeling them into the welding station is concerned. Subsequently, they can be rolled down as stated as only the compound or laminated strip needs to be sufficiently strong now for further machine processing. The niobium strip may originally have 0.1 mm thickness, the copper strip may be half a millimeter thick. Rolling is well permitted here to thin the niobium layer further after lamination.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawing 1, FIG. 1 shows a copper strip on tape 1 of 0.5 mm thickness reeled from a storage drum 2 in continuous process. The unreeled strip passes under an arc welding station 3 having at least one, preferably several electrodes 4 which do not melt. The welding station may be encapsuled (except for feeding and withdrawing) so that welding is carried out in a protective gas atmosphere.

Figure 1:
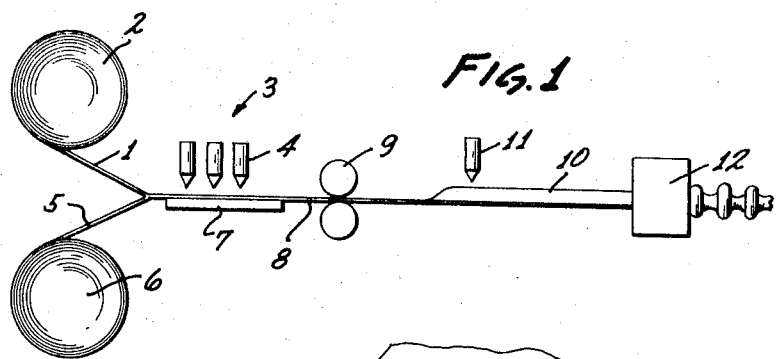
FIG. 1 is a schematic side elevation of the process equipment for practicing the method in accordance with the preferred embodiment of the invention.

One or several niobium strips on tapes 5 having thickness of, for example, 0.1 mm and being narrower than the copper tape are continuously reeled from a drum 6 and brought into flat, surface to surface contact with copper tape 1, just ahead of the welding station. The welding electrodes are disposed above copper tape 1 while the niobium tape 2 contacts the copper tape from below. As shown in the drawing, the overlay is such that portions along the edges of copper tape 1 are not covered by the niobium tape.

The welding electrodes 3 generate a localized, melted zone of the copper, indirectly heating also the niobium so that a diffusion zone is generated as between the copper and niobium, and two strips are welded to each other by diffusion, and upon subsequent cooling the diffusion zone is integral with both strips from opposite sides.

Strip or tape 5 moves over a sheet or plate 7 in the range of the welding station made of a material which is a poor conductor of thermal energy, for example a sheet made of steel traded under the designation $V_2A$ or a ceramic material. This sheet has the purpose of preventing unduly fast heat flow out of the welding zone, and that in turn is beneficial as to the available welding and processing speed generally. The thermal energy is locally accumulated by this heat flow impediment, which is particularly advantageous for obtaining lateral spreading of the heated zone and for the resulting broadened and equalized diffusion process.

Upon leaving the welding station, the laminated strip 8 as now produced runs through the gap of a pair of rolls 9 for rolling the strip down and for smoothing. The material is still warm at that point and the rolling reenforces the metallurgical bond of fusion.

Laminated strip 8 is then bent longitudinally and formed into a (split) tube 10 and the now adjoining longitudinal edges of the bent strip 8 are welded in a station 11. Finally, tube 10 is corrugated in a station 12 and the resulting corrugated tube is reeled thereafter and wound over a storage drum. The corrugation establishes sufficient flexibility as well as transverse strength so that the thin walled tube is not flattened upon reeling.

Figure 2:
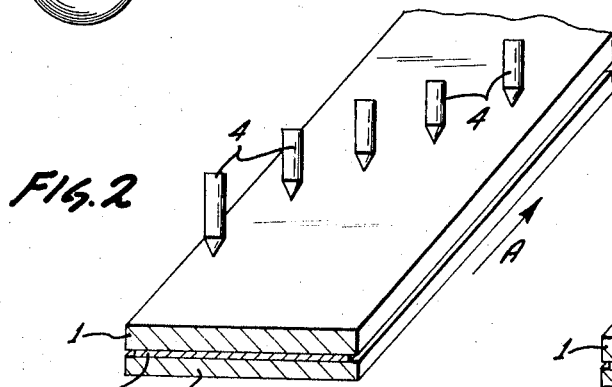
FIGS. 2 and 3 are isometric views of different welding stations in the equipment of FIG. 1.

The metallurgical bond between the niobium strip 5 and the copper strip 1 should exist preferably between the entire interface of surface-to-surface contact between the strips. It is, therefor, advantageous to arrange the electrodes 4 as shown in FIG. 2. The arrow A denotes the direction of advance of the strips, and the spacing between the electrodes as projected into the direction transverse to the direction A should be sufficiently small so that overlapping strip zones of welding are produced. Staggering of the electrodes is of advantage to avoid localized insufficient heating in the overlapping zone. As the laminated strip 8 leaves the welding station, the entire contacting surfaces have been converted into a more or less coherent zone of diffusion and fusion.

Figure 3:
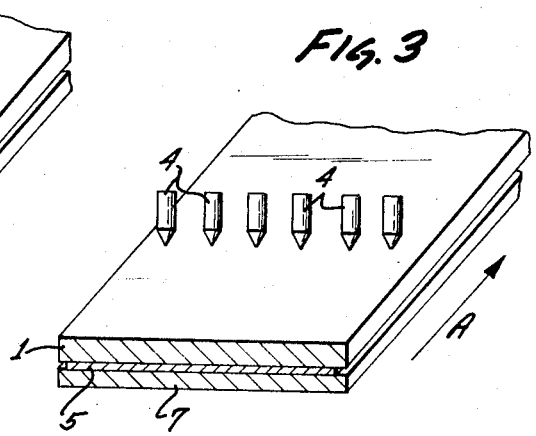

As shown in FIG. 3, it is not necessary that a single strip 5 be welded to a copper strip. Rather, several parallely paid in and side-by-side positioned strips $5^1$ may be used. Staggering of the electrodes may not be needed here, as the gaps between adjacent niobium strips do not have to be welded. However, staggering could be provided for if the individual niobium strips are still quite wide.

Figure 4:
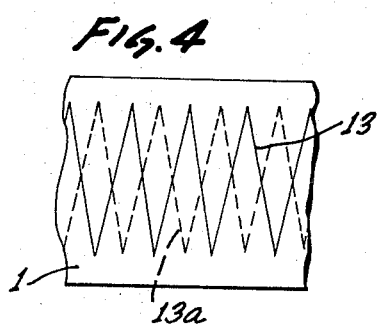
FIGS. 4 and 5 show different welding seam patterns produce with simplified equipment.

FIG. 4 shows welding seams which do not cover the entire area of contact. Rather there is a first zig-zag welding seam 13 resulting, for example, from a welding electrode which is moved transversely to the longitudinal strip extension and direction of advance, back and forth over the copper strip surface. The process is necessarily slower but requires only one electrode. However, a second electrode may criss-cross the tape in a 180° out of phase relation to produce a second zig-zag welding seam 13a. The extent of the welding may well suffice here, and this example can be considered to be a more economical version for practicing the invention.

Figure 5:
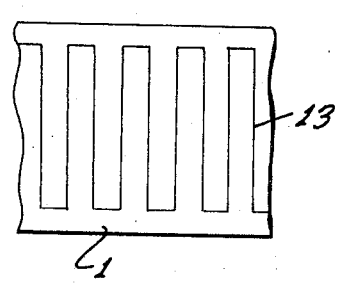

FIG. 5 shows another mode of welding. The welding seam 14 has a meandering configuration and results from stop and go operation of strip advance. The electrode moves across whenever the strips stop, while remaining adjacent one or the other of the edges as the strips moves for a short distance and stops. Again, one needs only one electrode but the progress is quite slow as compared with the continuous operations outlined above.

One can readily see, that practicing the method in accordance with FIGS. 4 or 5 does not necessarily mean that the entire interface of the strips is not converted into a zone of welding and bonding; this depends on the relative speed. If the strips advance sufficiently slow, overlapping welding seams can readily be obtained in either case but on a lower throughput basis for production.

Figure 6:
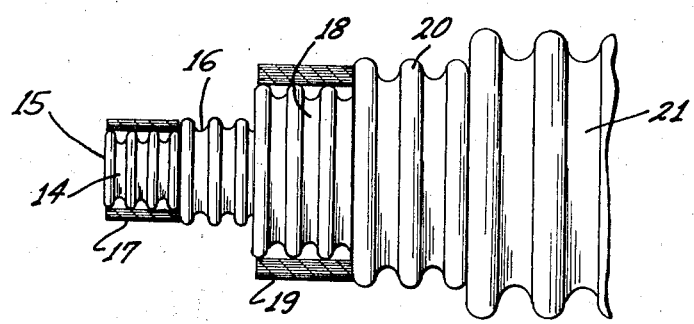
FIG. 6 is a side view into a cryogenic cable constructed under utilization of the invention.

FIG. 6 shows a cryogenic cable using concentric corrugated tubes, some of them having been made in accordance with the present invention. The cable has a corrugated, inner-most tube 15 made as explained above with reference to FIG. 1. The niobium strip of the laminated tube structure is on the outside of that tube.

Tube 15 is surrounded and received by a second tube 16, also made in that manner but with the niobium layer on the inside. The spacing between tubes 15 and 16 is filled with a so-called super insulation 17, e.g., paper layers penetrated and flown through by liquid helium. The inner tube 15 is likewise flown through by liquid helium.

Tube 16 is surrounded by another corrugated tube, 18, and the spacing between tubes 16 and 18 is evacuated. Still another corrugated tube, 20, of the assembly surrounds tube 18, and the space between tubes 18 and 20 is also filled with super-insulation 19. That space may be passed through by liquid nitrogen. A final, outer tube 21 surrounds tube 20, and the space between them is again evacuated.

Tubes 18, 20 and 21 do not have to made by the process as outlined above, because they do not serve as conductors; their principle function in conjunction with the insulation and evacuation, is to provide for a controlled temperature gradient into the interior of this tube assembly. The electrical conductor is carried out by the two tubes 15 and 16.

A cryogenic cable constructed as shown has excellent thermally insulative properties and can be made in large lengths, and on a continuous basis, in that sequentially strips are folded around the assembly as it is gradually build up from the inner most tube 15 which is made first in the stated manner, and tube 16 is similarly made from broader strip which is folded around tube 15, etc., until the outer most tube 21 is made by folding broad strip around the assembly which has been made up to that point. In view of the fact that every tube in the assembly is corrugated, the assembly remains flexible throughout and can adjust itself to thermal expansion and contraction without requiring special length compensation components. The cable can readily be reeled and transported on drums.

The principle advantage of the invention is to be seen in that a stabilized superconductor assembly can be made through welding, and wherein an intimate bond between copper and niobium strips provides for a low resistance connection between these parts. On the other hand, the two strip structure can be formed into a tube and corrugated, the laminated strip is sufficiently strong so that delamination does not have to be expected.

The invention is not limited to the embodiments described above but all changes and modifications thereof not constituting departures from the spirit and scope of the invention are intended to be included.

We claim:

1. Method for making a superconductor assembly, comprising the steps of:

providing a copper strip;

providing at least one niobium strip of narrower width than the copper strip;

progressively overlaying the strips longitudinally to obtain surface to surface contact between them, so that the edges of the copper strip remain free from the niobium;

providing localized arc-welding heating to the exposed surface of the copper strip as overlaying the niobium strip in at least one small spot with relative displacement between the welding arc and strip resulting in a welding seam line between niobium and copper strips, to obtain a metallurgical welding bond between the strips by generating diffusion in the area of surface contact between the strips along said line and adjacent to the portion as exposed to the welding arc;

impeding heat transfer from the exposed surface of the niobium strip during the arc welding to obtain spreading of the welding area beyond the area adjacent to the immediate exposure to the welding arc, transverse to said line;

longitudinally folding the welded together strips into a split tube, so that the edges of the copper strip abut; and welding the adjoining copper edge portions together to close the tube.

2. Method as in claim 1, wherein the last step includes the providing plural welding seams between the strips, said heat transfer impediment resulting in spreading of the seams towards each other.

3. Method as in claim 1, wherein the seams are provided in lateral overlap.

4. Method as in claim 1, wherein the entire contacting surfaces of the strips are welded to each other.

5. Method as in claim 4, wherein the welding is produced by plural overlapping seams.

6. Method as in claim 1, wherein the welding seams run parallel to each other, longitudinally to the extension of the strips.

7. Method as in claim 1, wherein the welding of the strips to each other is carried out by welding at least one continuous seam.

8. Method as in claim 7, wherein the seam is made to criss-cross over the length and width of the strips.

9. Method as in claim 1, followed by corrugating the tube.

10. Method as in claim 9, wherein the folding step is preceded by rolling the welded strips.

11. Method as in claim 1, wherein the strips are continuously reeled into the overlaid position and welded in a continuous process.

12. Method as in claim 1, followed by rolling the welded together strips.

13. Method as in claim 1, wherein a single copper strip is laid on plural, side by side positioned niobium strips and welded together.

* * * * *